United States Patent
Picone

(10) Patent No.: US 11,243,710 B1
(45) Date of Patent: Feb. 8, 2022

(54) SYSTEM AND METHOD FOR REMOTE DRIVE DESTRUCTION

(71) Applicant: Dominic B. Picone, Phoenix, AZ (US)

(72) Inventor: Dominic B. Picone, Phoenix, AZ (US)

( * ) Notice: Subject to any disclaimer, the term of this patent is extended or adjusted under 35 U.S.C. 154(b) by 60 days.

(21) Appl. No.: 16/371,434

(22) Filed: Apr. 1, 2019

Related U.S. Application Data

(60) Provisional application No. 62/651,473, filed on Apr. 2, 2018.

(51) Int. Cl.
| | |
|---|---|
| *B02C 19/00* | (2006.01) |
| *B02C 18/26* | (2006.01) |
| *B02C 4/08* | (2006.01) |
| *B02C 25/00* | (2006.01) |
| *G06F 3/06* | (2006.01) |

(52) U.S. Cl.
CPC .............. *G06F 3/0652* (2013.01); *B02C 4/08* (2013.01); *B02C 18/26* (2013.01); *B02C 19/0056* (2013.01); *B02C 25/00* (2013.01); *G06F 3/0623* (2013.01); *G06F 3/0673* (2013.01)

(58) Field of Classification Search
CPC ............ B02C 25/00; B02C 2018/0015; B02C 2018/162; B02C 4/02; B02C 4/08; B02C 19/0056; B02C 18/26; G06F 21/86; G06F 21/88; G06F 21/78; G06F 21/79;
(Continued)

(56) References Cited

U.S. PATENT DOCUMENTS

| | | | |
|---|---|---|---|
| 6,799,737 B1 * | 10/2004 | Bargert | B02C 18/148 |
| | | | 241/34 |
| 9,430,654 B1 * | 8/2016 | Rajaie | G06Q 10/087 |

(Continued)

FOREIGN PATENT DOCUMENTS

| | | |
|---|---|---|
| CN | 201600703 U | 6/2010 |
| CN | 102157198 A | 8/2011 |

(Continued)

OTHER PUBLICATIONS

McCormick, R. "These Solid State Hard Drives Will Sel-destruct If YouText Them—Secure Drives' Ssds Will Break Themselves on Demand" Oct. 1, 2014 <https://www.theverge.com/2014/10/1/6877217/autothysis-solid-state-hard-drives-will-self-destruct-if-you-text-them>.

(Continued)

*Primary Examiner* — Adam J Eiseman
*Assistant Examiner* — Katie L. Parr
(74) *Attorney, Agent, or Firm* — Booth Udall Fuller, PLC

(57) ABSTRACT

A self-destructive storage system and method is disclosed. The system includes a digital storage, and a destruction mechanism located proximate the digital storage and configured to physically render the digital storage unreadable upon activation. The system also includes a controller having a processor and a memory. The controller is communicatively coupled to the destruction mechanism and is configured to activate the destruction mechanism in response to at least one of the receipt of a destroy command and the satisfaction of a predefined condition. The system also includes a wireless network interface that is communicatively coupled to the controller and a wireless network. The digital storage device, the controller, and the destruction mechanism are coupled to a drive enclosure.

15 Claims, 13 Drawing Sheets

(58) Field of Classification Search
CPC .. G06F 21/80; G06F 2221/2143; G06F 12/14; G11B 23/28; G11B 23/281
See application file for complete search history.

(56) References Cited

U.S. PATENT DOCUMENTS

| | | | |
|---|---|---|---|
| 10,055,596 B1* | 8/2018 | Czamara | G06F 21/88 |
| 10,071,382 B1* | 9/2018 | Ebadian | B02C 18/22 |
| 10,556,240 B2* | 2/2020 | Clark | B02C 25/00 |
| 10,645,825 B1* | 5/2020 | Hurt | G06F 21/88 |
| 2004/0252628 A1 | 12/2004 | Detzler | |
| 2007/0057099 A1* | 3/2007 | Kubo | B02C 25/00 241/101.2 |
| 2008/0029628 A1* | 2/2008 | Rodriguez | B02C 25/00 241/36 |
| 2012/0151121 A1 | 6/2012 | Braga | |
| 2013/0320121 A1* | 12/2013 | Ko | B02C 23/02 241/63 |
| 2014/0001295 A1* | 1/2014 | Stofan | G06F 21/79 241/30 |
| 2014/0208965 A1* | 7/2014 | Noblitt | B02C 18/16 100/99 |
| 2014/0263216 A1 | 9/2014 | Clark | |
| 2014/0373166 A1* | 12/2014 | Little | G06F 21/86 726/26 |
| 2015/0314299 A1* | 11/2015 | Heffernan, Jr | B02C 18/0007 241/25 |
| 2015/0328642 A1* | 11/2015 | Shegerian | B02C 18/2216 241/30 |
| 2017/0156223 A1* | 6/2017 | Fisher | G06F 21/86 |
| 2017/0277901 A1* | 9/2017 | Hofleitner | G06F 21/88 |
| 2018/0236459 A1* | 8/2018 | Clark | G06F 21/80 |
| 2019/0132125 A1* | 5/2019 | Arroyo | G06F 21/78 |
| 2021/0022557 A1* | 1/2021 | Atinaja | B02C 25/00 |

FOREIGN PATENT DOCUMENTS

| | | |
|---|---|---|
| CN | 102819499 A | 12/2012 |
| CN | 105608397 A | 5/2016 |
| CN | 105825151 A | 8/2016 |
| CN | 205581873 U | 9/2016 |
| CN | 106557283 A | 4/2017 |
| CN | 106919863 A | 7/2017 |
| CN | 206431630 U | 8/2017 |
| CN | 107862222 A | 3/2018 |
| CN | 107995617 A | 5/2018 |
| CN | 108038365 A * | 5/2018 |
| CN | 207302058 U | 5/2018 |
| IN | 201611022606 A | 2/2018 |
| JP | 2007335046 A | 3/2015 |

OTHER PUBLICATIONS

"World's First Ssd With Remote Secure Erase and Self-destruction" Feb. 16, 2015 <http://www.waitanssd.com/pr/1tb-ssd-2tb-ssd-ftb-ssd-secure-erase-purge-fast-erase-solid-state-drive-waitan.pdf>.

* cited by examiner

SYSTEM AND METHOD FOR REMOTE DRIVE DESTRUCTION

RELATED APPLICATIONS

This application claims the benefit of U.S. provisional patent application 62/651,473, filed Apr. 2, 2018 titled "System and Method for Remote Drive Destruction," the entirety of the disclosure of which is hereby incorporated by this reference.

TECHNICAL FIELD

Aspects of this document relate generally to remote destruction of storage devices.

BACKGROUND

Technological advances have increased both the capacity for storing information, as well as what can be done with that information. As a consequence, more sensitive information exists in a digital format than ever before. Sophisticated methods have been developed, and continue to improve, to protect that information from digital attack. However, there are few reliable defenses against exposure of sensitive information when someone has taken physical possession of the storage device.

Methods exist for the rapid physical destruction of drives. Government agencies and some companies make use of in-house hard drive shredders. US Consulates and other government posts in foreign countries have data destruction procedures in case of an emergency evacuation. However, these devices and methods can be complicated and expensive, and are based on the assumption that physical control of the device has not been lost.

SUMMARY

According to one aspect, a self-destructive storage system includes a digital storage, and a destruction mechanism that is mechanical and proximate the digital storage. The destruction mechanism is configured to physically render the digital storage unreadable upon activation. The self-destructive storage system also includes a controller having a processor and a memory. The controller is communicatively coupled to the destruction mechanism and is configured to activate the destruction mechanism in response to at least one of the receipt of a destroy command and the satisfaction of a predefined condition. The system also includes a wireless network interface communicatively coupled to the controller and a wireless network, as well as a battery coupled to the controller and the destruction mechanism. The digital storage device, the controller, the battery, and the destruction mechanism are coupled to a drive enclosure.

Particular embodiments may comprise one or more of the following features. The destruction mechanism may include a first roller, a second roller, and/or a first motor coupled to at least one of the first roller and the second roller, and communicatively coupled to the controller. The system may further include a shuttle slideably coupled to a linear guide of the drive enclosure. One of the destruction mechanism and the digital storage may be fixedly coupled to the shuttle and slideably coupled to the drive enclosure through the shuttle. The first roller may be positioned above a plane of the digital storage and the second roller may be positioned below the plane of the digital storage and proximate the first roller. Each roller may have a plurality of teeth that at least partially interlock. Upon activation of the destruction mechanism, the first motor may rotate the first and/or second rollers in opposite directions and the shuttle may be driven along the linear guide, causing the digital storage to pass between the first and second rollers where it may be crushed. The first motor may be a stepper motor. Upon activation of the destruction mechanism, the shuttle may be driven along the linear guide by a second motor that may be a linear actuator. The system may also include a sensor that may be at least one of an accelerometer, a light sensor, a gas sensor, a microswitch, and a GPS receiver. The satisfaction of a predefined condition may include receiving a reading from the sensor indicating attempted tampering with the system. The digital storage may be configured to communicatively couple with a computer through the controller. The controller may be configured to allow the digital storage to be mounted by the computer only upon verification that a destroy command has not been issued. The system may be dimensioned to fit within a standard drive bay. The system may be sized to fit inside a laptop computer.

According to another aspect of the disclosure, a self-destructive storage system includes a digital storage, and a destruction mechanism proximate the digital storage and configured to physically render the digital storage unreadable upon activation. The system also includes a controller having a processor and a memory. The controller is communicatively coupled to the destruction mechanism and configured to activate the destruction mechanism in response to at least one of the receipt of a destroy command and the satisfaction of a predefined condition. The digital storage device, the controller, and the destruction mechanism are coupled to a drive enclosure.

Particular embodiments may comprise one or more of the following features. The destruction mechanism may be mechanical. The linear guide may be a slot in the drive enclosure. The destruction mechanism may include a supply of cryofluid that may have an electric valve proximate the digital storage and may be communicatively coupled to the controller. The destruction mechanism may also include at least one heating element in thermal contact with the digital storage and may be communicatively coupled to the controller. Upon activation of the destruction mechanism, the at least one heating element and the electric valve of the cryofluid supply may be operated by the controller to create a severe thermal gradient in the digital storage, resulting in fracturing. The system may further include a battery coupled to the controller and the destruction mechanism. Finally, the system may include a wireless network interface communicatively coupled to the controller and a wireless network According to yet another aspect of the disclosure, a method for remote drive destruction includes receiving a destroy command through a controller having a processor and a memory. The controller is communicatively coupled to a wireless network through a wireless network interface. The method also includes activating a destruction mechanism in response to the destroy command. The destruction mechanism is communicatively coupled to the controller and located proximate a digital storage. The destruction mechanism is configured to physically render the digital storage unreadable upon activation. The digital storage device, the controller, and the destruction mechanism are coupled to a drive enclosure dimensioned to fit within a standard drive bay.

Particular embodiments may comprise one or more of the following features. The method may also include determining, using the controller, if a predefined condition has been satisfied, and activating the destruction mechanism in response to the determination that a predefined condition has been satisfied. The method may additionally include verifying, using the controller, that a destroy command was not issued while the controller was not powered, and/or mounting the digital storage on a computer in response to determining that a destroy command was not issued. The destruction mechanism may be mechanical and may include a first roller, a second roller, and a motor coupled to at least one of the first roller and the second roller and communicatively coupled to the controller. The destruction mechanism may also include a shuttle slideably coupled to a linear guide. One of the destruction mechanism and the digital storage may be fixedly coupled to the shuttle and may be slideably coupled to the drive enclosure through the shuttle. The first roller may be positioned above a plane of the digital storage and the second roller may be positioned below the plane of the digital storage and proximate the first roller. Each roller may have a plurality of teeth that at least partially interlock. Activating the destruction mechanism may include driving the first and second rollers to rotate in opposite directions, and/or driving the shuttle along the linear guide, causing the digital storage to pass between the first and second rollers where it may be crushed.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventor is fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1A:
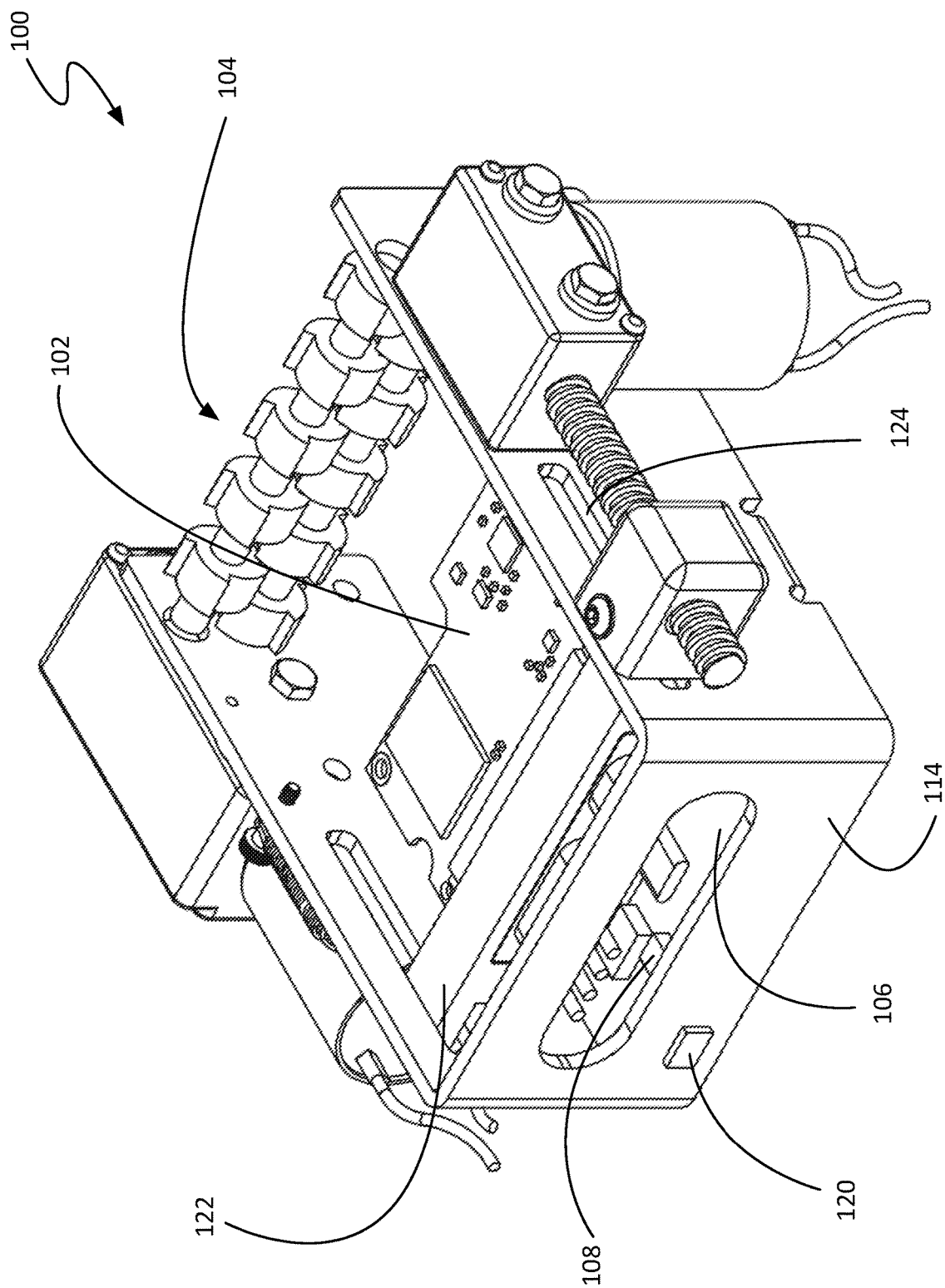
FIGS. 1A-1D are perspective, top, bottom, and exploded views of a self-destructive storage system, respectively.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Technological advances have increased both our capacity for storing information, as well as what can be done with that information. As a consequence, more sensitive information exists in a digital format than ever before. Sophisticated methods have been developed, and continue to improve, to protect that information from digital attack. However, there are few reliable defenses against the exposure of sensitive information when someone has taken physical possession of the storage device.

Methods exist for the rapid and total physical destruction of drives. Government agencies and some companies make use of in-house hard drive shredders. US Consulates and other government posts in foreign countries have data destruction procedures in case of an emergency evacuation. However, these devices and methods can be complicated and expensive, and are based on the assumption that physical control of the device has not been lost.

Additionally, conventional drive destruction systems would either require the time-consuming task of disassembling a drive before processing, or possess the capacity to not only demolish the fragile storage device, but also the more robust case enclosing it, increasing the cost and size. There is a need for an inexpensive, remotely activated drive destroyer to protect sensitive government (e.g. classified material, etc.), industrial (e.g. trade secrets or other intellectual property, etc.), or personal (e.g. financial documents, media, etc.) information.

Contemplated herein is a system and method for remote drive destruction. Instead of relying on an external device to destroy a drive with sensitive information, the destruction mechanism is built into the drive, or drive enclosure, itself. Using the network connectivity of the computer in which the drive is installed, or using a separate networking interface, the destruction mechanism may be activated remotely. The system may be housed inside a standard hard drive case, and may be able to fit inside industry standard drive bays. Making use of an internal and/or external battery protects the device from interruption due to power outage. This method is advantageous over conventional methods of physically destroying storage devices, as it can be remotely activated, is practical for individuals, and can be used in commodity hardware.

Figure 1B:
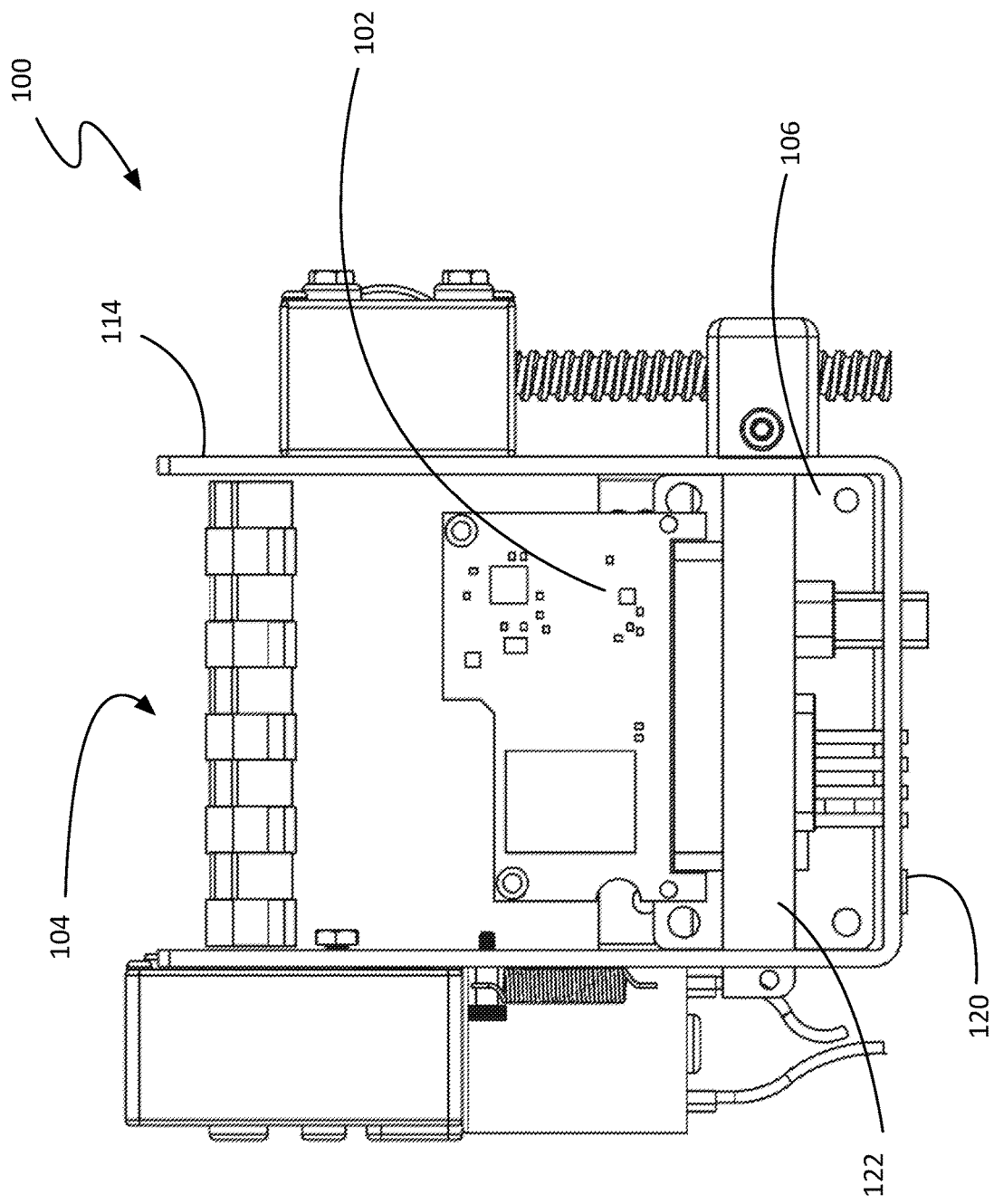
Figure 1C:
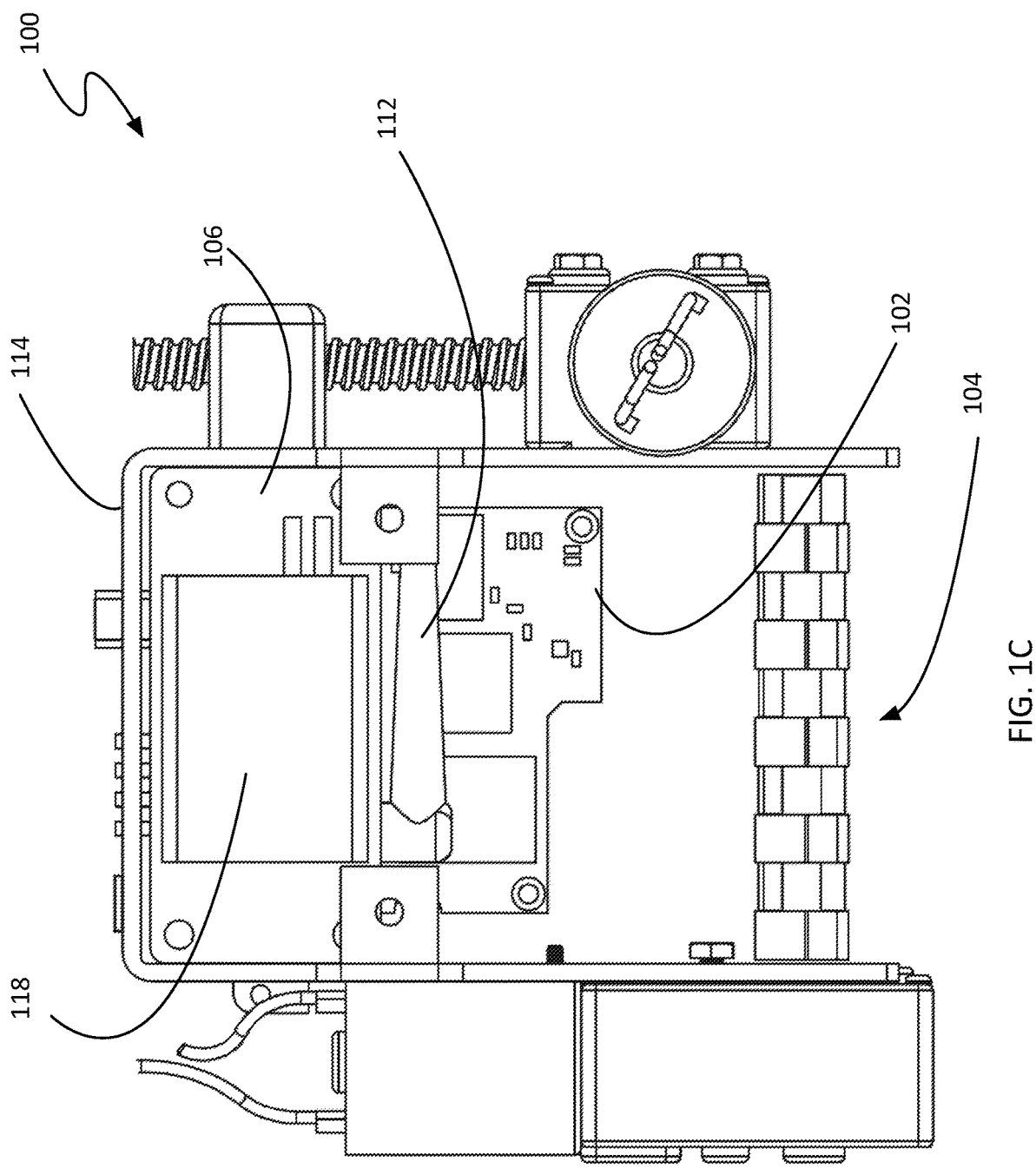
Figure 1D:
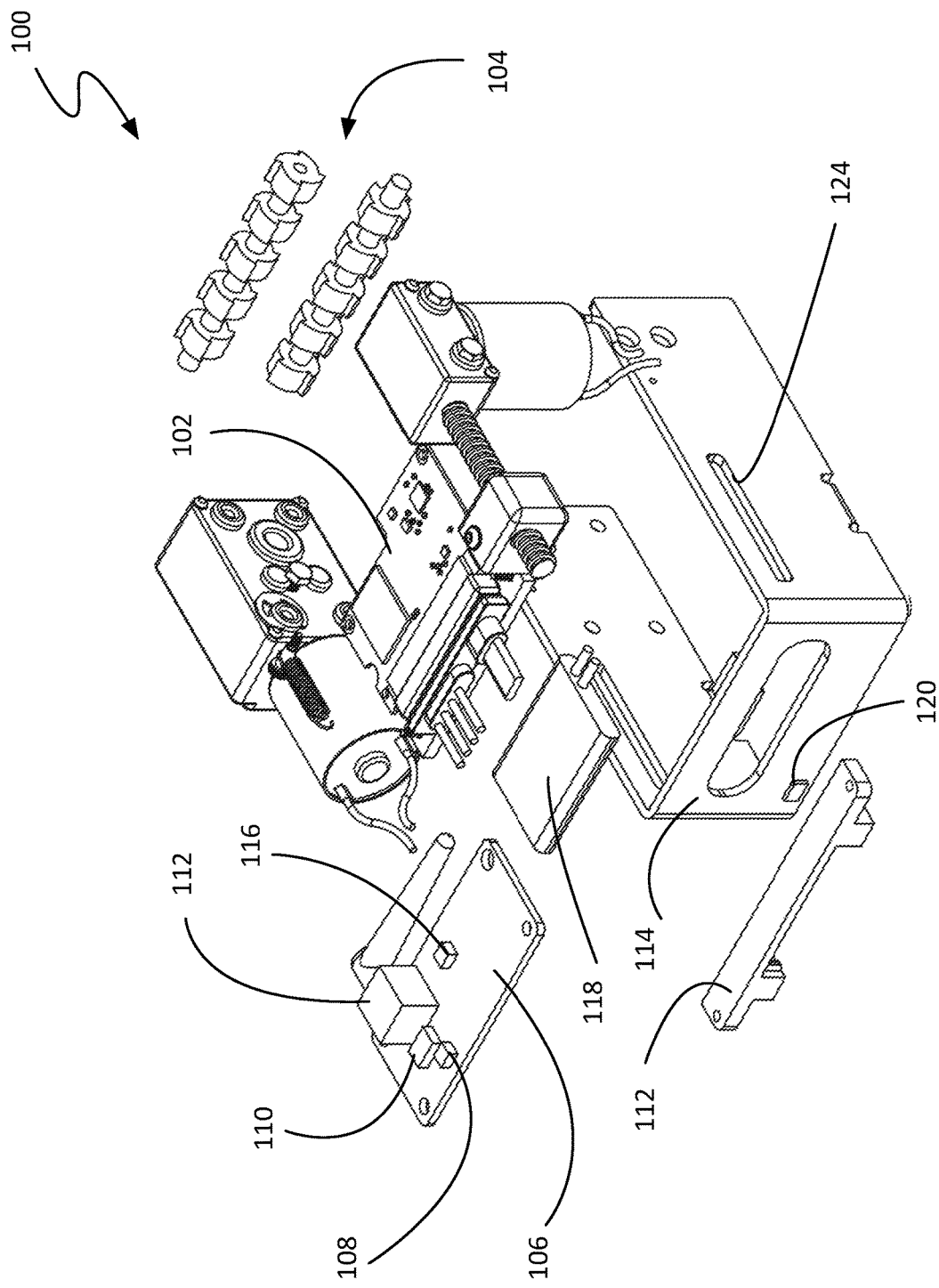

FIGS. 1A-1D show various views of a non-limiting example of a self-destructive storage system. Specifically, FIG. 1A is a perspective view, FIG. 1B is a top view, FIG. 1C is a bottom view, and FIG. 1D is an exploded perspective view.

As shown, the system 100 comprises a digital storage 102, a destruction mechanism 104, a controller 106 having a processor 108 and a memory 110, and a network interface 112, all housed within, or coupled to, a drive enclosure 114. Some embodiments may further include a sensor 116 and a battery 118. Furthermore, some embodiments may omit the network interface 112 and rely on local activation, either manual or automatic (e.g. from a host computer, etc.).

According to various embodiments, the self-destructive storage system 100 interfaces with a computer or other device like a conventional digital storage drive. However, upon receipt of a destroy command, which may be sent over a network, or the satisfaction of a predefined condition, the destruction mechanism 104 is activated and the digital storage 102 is physically destroyed or otherwise placed in a condition from which no information can be retrieved.

In the context of the present description, a digital storage 102 may be any computer-readable storage medium, including but not limited to solid state, magnetic, and optical mediums, as well as digital storage mediums not yet available. The use of solid-state storage may be advantageous for use in a self-destructive storage system 100 because, in addition to the advantages inherent to solid-state storage over other methods, it is very susceptible to physical destruction (e.g. it can be more difficult to restore a mangled solid state drive than an equally damaged magnetic or optical storage).

The self-destructive storage systems 100 contemplated herein may be configured for use with any computer bus types known in the art. For example, in some embodiments, the digital storage 102 may utilize a serial ATA (SATA) bus. In one embodiment, the digital storage 102 may operate on a USB bus, which may be advantageous as the controller 106 may be configured to join the same USB bus as a storage or human interface device (HID), which may simplify interaction between the computer and the controller 106, as will be discussed further, below.

In some embodiments, the digital storage 102 may be replaceable or upgradable by the end user. For example, in some embodiments, a user may insert a standard solid state storage device, essentially a PCB with memory chips, into the drive enclosure 114. In other embodiments, particularly embodiments making use of magnetic media, the digital storage 102 may be permanently affixed within the drive enclosure 114.

As shown, the destruction mechanism 104 is located proximate the digital storage 102. In the context of the present description, a destruction mechanism 104 is a mechanism configured to physically alter a near-by digital storage 102 such that the data it contains is irretrievable. The data may be rendered irretrievable by destroying the data itself, destroying the ability to read the data (e.g. data is still written to magnetic platters but the platters have been shattered, etc.), or both.

According to various embodiments, the destruction mechanism 104 may be mechanical. For example, in some embodiments, the destruction mechanism 104 may utilize shredding, crushing, grinding, or penetrating mechanisms to make the data contained within the digital storage 102 irretrievable. Some destruction mechanisms 104 may use linear motions, while others may employ rotational motions, and may utilize motors, solenoids, linear actuators, or the like. As a specific example, in one embodiment, the destruction mechanism 104 may crush the digital storage 102 between two plates driven towards each other by a threaded drive. In other embodiments, any other mechanical mechanism known in the art may be employed, so long as it fits within the drive enclosure 114. An embodiment making use of rollers with interlocking teeth will be discussed in greater detail with respect to FIGS. 3A-D, below.  Another embodiment making use of screws will be discussed in greater detail with respect to FIGS. 5A-B, below.

In other embodiments, the destruction mechanism 104 may be magnetic, or utilize an electrical overload, for properly isolated digital storage 102 (e.g. the computer is protected from damage through the data connection). For example, in one embodiment, the destruction mechanism 104 may cause rapid oscillation of a very localized magnetic field around the digital storage 102. The changing field will induce currents in the digital storage 102 until the conduction traces are destroyed.

Other destruction mechanisms 104 may employ other devices and technologies, including but not limited to, chemical (e.g. dissolving a specially chosen substrate within the digital storage 102, etc.), optical (e.g. lasers, etc.), and the like. An embodiment making use of thermal shock will be discussed with respect to FIG. 4, below.

In some embodiments, the destruction mechanism 104 may draw power from the same source as the digital storage 102 (e.g. external power source, internal power supply of a computer, etc.). In other embodiments, the destruction mechanism 104 may be powered by a battery 118 inside of the drive enclosure 114, as will be discussed further, below. As an option, the destruction mechanism 104 may rely on the same power source as the digital storage 102, using a battery 118 as a backup power source.

The controller 106 is a device that is capable of triggering the destruction of the digital storage 102. According to various embodiments, the controller 106 comprises a processor 108 and a memory 110. The controller 106 is configured to activate the destruction mechanism 104 in response to the receipt of a destroy command 204, as will be discussed further in the context of FIG. 2, below. The controller 106 may be a single board computer (e.g. a Raspberry Pi, etc.), a single board microcontroller (e.g. Arduino, etc.), a specialized embedded system, or any other similar system known in the art. In some embodiments, the controller 106 is located inside the drive enclosure 114. As will be discussed with respect to FIG. 5, in other embodiments, the role of the controller 106 may be filled by a device external to the drive enclosure 114.

As shown, the controller 106 is controller 106 communicatively coupled to the destruction mechanism 104. In some embodiments, the controller 106 may also be communicatively coupled to the computer making use of the digital storage 102. In still other embodiments, the controller 106 may also be communicatively coupled to the digital storage 102, such that the controller 106 stands between the digital storage 102 and the computer, and is able to prevent the use of the digital storage 102 unless a certain condition is satisfied. This will be discussed further with respect to FIG. 2, below.

According to various embodiments, the controller 106 may initiate the destruction of the digital storage 102 based on a variety of conditions or events, other than the receipt of a destroy command 204. For example, in one embodiment, the self-destructive storage system 100 may further comprise a manual switch 120 (e.g. a switch accessible from the front of a computer enclosure when the drive is installed in an expansion or drive bay, a switch accessible from inside a computer enclosure, etc.). As an option, the manual switch 120 may be secured to prevent unauthorized or accidental activation (e.g. key, RFID reader, biometric scanner, etc.).

In some embodiments, the controller 106 may be configured to automatically initiate destruction of the drive in response to signals received from one or more sensors 116 inside of the drive enclosure 114. Examples include, but are not limited to, motion detectors (e.g. accelerometers, etc.), tamper detection sensors (e.g. devices that detect attempts to remove the drive from a computer, sensors to detect the breach of a sealed drive enclosure 114 such as light or gas sensors, a microswitch to detect the opening of a releasable drive enclosure 114, etc.), GPS receivers, and the like.

As a specific example, an accelerometer may determine if the drive is being moved, and upon such a determination, activate a GPS receiver. Upon leaving a pre-established geofence, the storage system 100 may automatically self-destruct using a destruction mechanism 104 powered by a battery 118. In some embodiments, one or more sensors 116 may exist as part of another component of the system 100. As a specific example, in one embodiment, the wireless network interface 112 may also comprise a GPS receiver and an electronic compass.

The self-destructive storage system 100 contemplated herein are advantageous over conventional drive destruction systems because it addresses the scenario where physical possession of the drive has been lost. The controller 106 can activate the destruction mechanism 104 in response to the receipt of a destroy command 204. In some embodiments, that command may be provided to the controller 106 by the computer to which the storage system 100 is connected. As a specific example, in one embodiment, the storage system 100 may be implemented as an external network accessible storage (NAS) device, using an Ethernet connection rather than USB or the like. The interface with the storage system 100 would be configured to require the provision of internet access to the controller 106.

In other embodiments, the controller 106 may have access to a network (e.g. the Internet) independent of other devices. As shown, the self-destructive storage system 100 may comprise a wireless network interface 112 that is at least partially inside of the drive enclosure 114 (e.g. some embodiments may employ an external antenna, etc.). The wireless network interface 112 is communicatively coupled to the controller 106 and a wireless network, and allows the controller 106 to access a Wi-Fi or cellular network and receive instructions remotely. The wireless network interface 112 may utilize one or more of a variety of known communication protocols and standards including, but not limited to, Wi-Fi, voice, SMS, GPRS, DTMF, MMS, HTTP, and the like.

According to various embodiments, destroy commands 204 may be sent to the self-destructive storage system 100 over the Internet via a web interface, a mobile application, or other channels known in the art. In some embodiments, the destroy command 204 may be sent through a neutral third party, such as a social network or other public forum. For example, the controller 106 may monitor an account or a particular post, and upon reading a post containing a predefined data (e.g. a pass phrase, a code sequence, a particular image, etc.), the destruction mechanism 104 may be activated.

In some embodiments, the wireless network interface 112 may be a cellular modem, which would allow the controller 106 to maintain network connectivity even in the event of a power outage local to the computer. As an option, the cellular modem may remain inactive until a loss of main power is detected, preserving bandwidth and reducing cost. In some embodiments, the controller 106 may use the cellular modem to access the internet in the same was a Wi-Fi-based embodiment would. In other embodiments, the controller 106 may be used exclusively within the cellular network, employing voice calls and/or text messages to receive destroy commands 204. For example, the cellular modem may wait to receive a voice call from a particular number or a text message containing a password before activating the destruction mechanism 104.

According to various embodiments, the self-destructive storage system 100 may draw power through the power supply of the host computer, or through a separate power conduit. In some embodiments, the self-destructive storage system 100 may further comprise an internal battery 118, to power the controller 106. In some embodiments, the battery 118 may also power the destruction mechanism 104, in case of a power outage. As an option, the battery 118 may also serve as an uninterruptable power supply (UPS) for the storage device 102. In other embodiments, the system 100 may make use of an external UPS as well. The battery 118 may be of any type known in the art, including but not limited to lithium ion, lithium ion polymer, and the like. As an option, the battery 118 may be charged using the same power source as the digital storage 102.

A scenario that conventional drive destruction methods have struggled to deal with is destroying the drive after someone else has taken physical possession. While some embodiments of the self-destructive storage system 100 may include a battery 118 to allow reception and carrying out of destroy commands 204 sent through a network, it is plausible that one could shield the system 100 from wireless signals while waiting for the battery 118 to drain. According to various embodiments, the self-destructive storage system 100 may be configured such that upon powering up, the drive data may be inaccessible (e.g. data connection to computer is deactivated, etc.) until the controller 106 has verified that destroy orders 204 were not transmitted while the system 100 did not have power. This may be accomplished by routing the destroy orders 204 through a persistent data source, such as a server 208 specific to the self-destructive drive technology, or a third party server 216 (e.g. social network, public forum, etc.).

As shown, the components of the self-destructive storage system 100 may be housed within a drive enclosure 114. In some embodiments, the drive enclosure 114 may completely surround all, or a majority of the other components of the self-destructive storage system 100. In other embodiments, including the non-limiting example shown in FIGS. 1A-1D, the drive enclosure 114 may simply provide a frame or chassis to which the other components may be attached, and which is configured for coupling to a standard bay within a computer or other enclosure. In some embodiments, some components of the system 100 may be coupled to the outside of the drive enclosure 114.

According to various embodiments, the drive enclosure 114 may be sized to fit in a standard drive bay (e.g. half height, full height, etc.) commonly used in computer enclosures, allowing the system 100 to be deployed in traditional desktop computers. In some embodiments, the system 100 may be installed inside a computer or laptop as an internal drive. In other embodiments, the system 100 may be exist as an external device, and operate as an external hard drive or a network accessible storage device.

According to various embodiments, the drive enclosure 114 of the self-destructive storage system 100 may have one or more openings for data and power cables for the digital storage 102 (e.g. the enclosure 114 shown in FIGS. 1A-1D, etc.), while in other embodiments the enclosure 114 may have standard power and data ports on its exterior, similar to conventional drives. In some embodiments, the self-destructive storage system 100 may be enclosed in an enclosure 114 that makes it appear to be a conventional storage device, in an effort to dissuade an intruder from taking special measures to preserve the stored data (e.g. wireless shielding, battery draining, disassembly, etc.). In other embodiments, the self-destructive storage system 100 may utilize an enclosure 114 that allows an end user to install any of a variety of properly dimensioned digital storage 102. This may be advantageous, in that it allows a user to upgrade their system 100 without the expense of a new self-destructive storage system 100.

In some embodiments, the destruction mechanism 104 involves the movement of one or more components of the system 100 within the drive enclosure 114. For example, in some embodiments there will be a relative linear movement. As shown in FIGS. 1A-1D, some embodiments comprise one or more linear guides 124 and a shuttle 122. As will be discussed in greater detail below with respect to FIGS. 3A-3D, the shuttle 122 and linear guide 124 operate together in some embodiments to permit relative motion of the destruction mechanism 104 and the digital storage 102 towards each other upon activation of the destruction mechanism 104 (e.g. the storage 102 moves towards the mechanism 104, the mechanism 104 moves towards the storage 102, etc.).

In other embodiments, the operation of the destruction mechanism 104 does not require the rearrangement of components within the drive enclosure 114. See, for example, the thermal shock-based destruction mechanism of FIG. 4.

Figure 2:
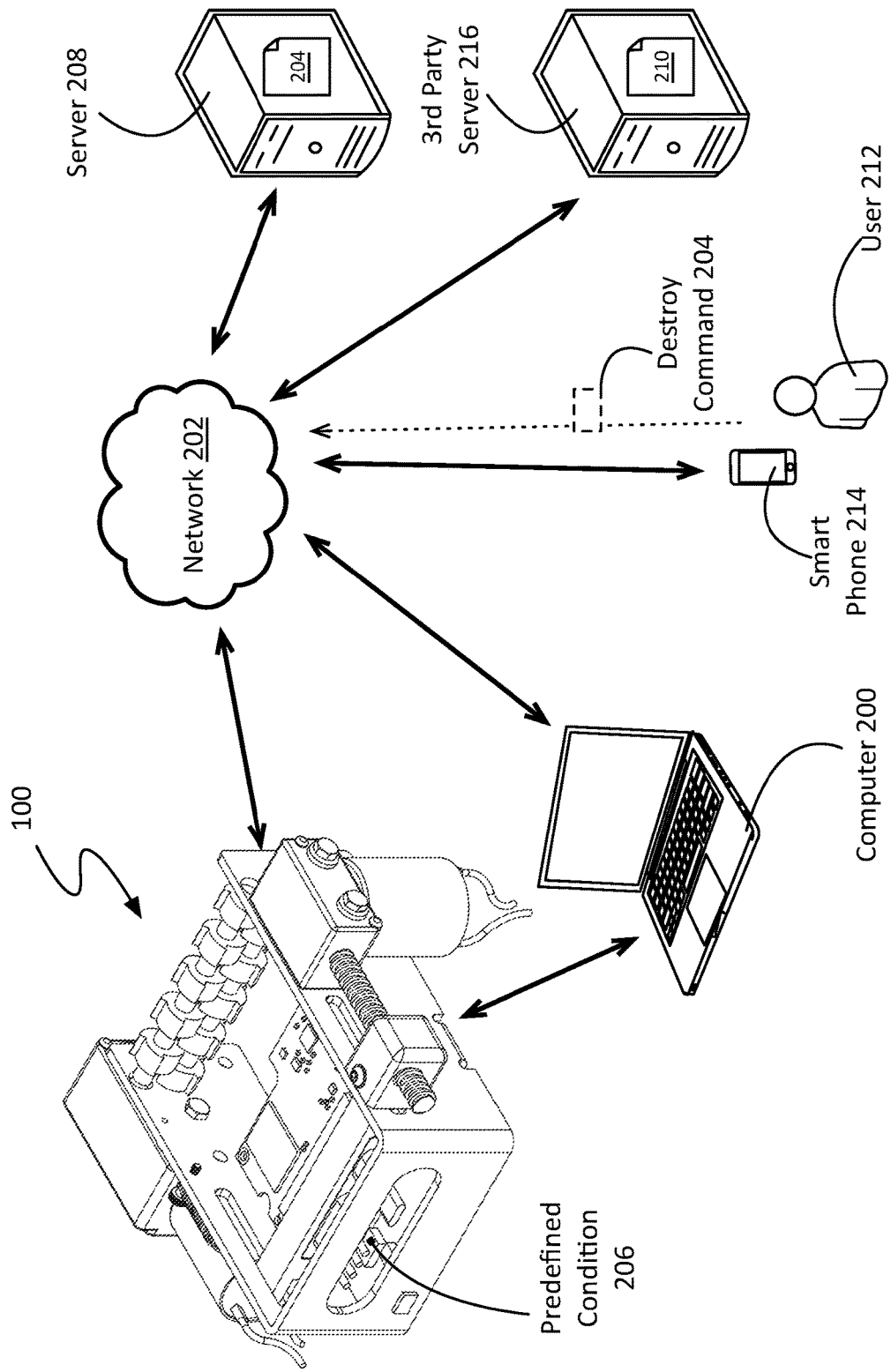
FIG. 2 is a network view of a self-destructive storage system.

FIG. 2 is a network view of a non-limiting example of a self-destructive storage system 100 in use. As shown, the system 100 is communicatively coupled to a computer 200. While FIG. 2 depicts the system 100 as being external to the computer 200, it should be understood that some embodiments of the self-destructive storage system 100 may have a drive enclosure 114 sized such that the system 100 may be installed inside a computer 200 (e.g. desktop, laptop, rack mounted server unit, etc.) as though it was a standard peripheral. For example, in one embodiment, the system 100 may be installed inside the drive or expansion bay of a laptop. In another embodiment, the system 100 may be installed inside a 3.5" drive caddy used in a rack-mounted server. In still another embodiment, the system 100 may be slightly larger and take up more than one expansion bay within a rack-mount server or desktop device. In some embodiments, the system 100 may even appear to be a conventional internal hard drive. In other embodiments, the system 100 may take the form of an external storage device, as previously discussed.

As shown, the controller 106 is communicatively coupled to a network 202 through the wireless network interface 112. Over this network connection, the controller 106 may receive a destroy command 204, causing it to activate the destruction mechanism 104 and render the digital storage 102 unreadable. According to various embodiments, destroy commands 204 may be sent to the self-destructive storage system 100 over the Internet via a web interface, a mobile application, or other channels known in the art. In some embodiments, the transmission of a destroy command 204 may be directly to the controller 106.

In some embodiments, the destroy command 204 may be passed through a server, meaning it is sent by a user 212 from the source of the command 204 (e.g. smart phone 214) to a server, where it waits. The controller 106 may periodically check in with the server 208 to see if a destroy command 204 has been issued. In some embodiments, the controller 106 may check in with the server 208 in response to an event, including but not limited to the system 100 powering up, re-establishing a network connection, in response to a signal from a sensor 116 (e.g. movement of the system detected, etc.).

In some embodiments, server 208 may handle reception of destroy commands 204, verification of said commands (e.g. authentication of user 212, etc.), and transmission of destroy commands 204 to the controller 106. In some embodiments, server 208 may in fact be multiple computers, and may silo various responsibilities for security. For example, in one embodiment, the transmission of destroy commands 204 may be isolated from authentication and reception. In some embodiments, the server 208 may not send anything to a controller 106 that is not in response to a request made by the controller 106, preventing a malicious party from sending a false destroy command 204.

In some embodiments, the controller 106 may prevent access to the digital storage 102 until it has verified with the server 208 that a destroy command 204 has not been sent. As a specific example, in one embodiment, the controller 106 and the digital storage 102 may interface with the computer 200 on a USB bus, in a chain, with the controller 106 coming before the digital storage 102. The controller 106 may not allow the digital storage 102 onto the USB chain until it has verified that a destroy command 204 does not exist on a server 208. Those skilled in the art will recognize that this functionality may be achieved using a bus other than USB in other embodiment.

In some embodiments, the destroy command 204 may be sent through a server 216 belonging to a neutral third party, such as a social network or other public forum. For example, the controller 106 may monitor an account or a particular post, and upon reading a post containing a predefined data 210 (e.g. a pass phrase, a code sequence, a particular image, an image with a particular steganographic signature, etc.), the destruction mechanism 104 may be activated.

It should be noted that, in some embodiments, the destroy command 204 may incorporate a form of authentication to prevent accidental or malicious activation of the destruction mechanism 104. Authentication of destroy commands 204 may include, but is not limited to, public/private key encryption, passphrases, rolling authentication codes, and the like.

According to some embodiments, the controller 106 may be configured to initiate destruction of the digital storage 102 in response to the satisfaction of a predefined condition 206. For example, in one embodiment, destruction may be automatically initiated based on a command generated by the computer 200 in which the system 100 is installed, in response to a determination that physical security has been compromised. Examples include, but are not limited to, failed password or biometric login attempts, motion detection via connected camera, failure to deactivate intrusion detection within a preset amount of time, failure to authenticate within a repeating window of time (e.g. dead man's switch), and the like. Other examples of predefined conditions 206 include, but are not limited to, signals from a sensor 116 indicating tampering or theft, activation of a manual switch 120, and the like.

Figure 3A:
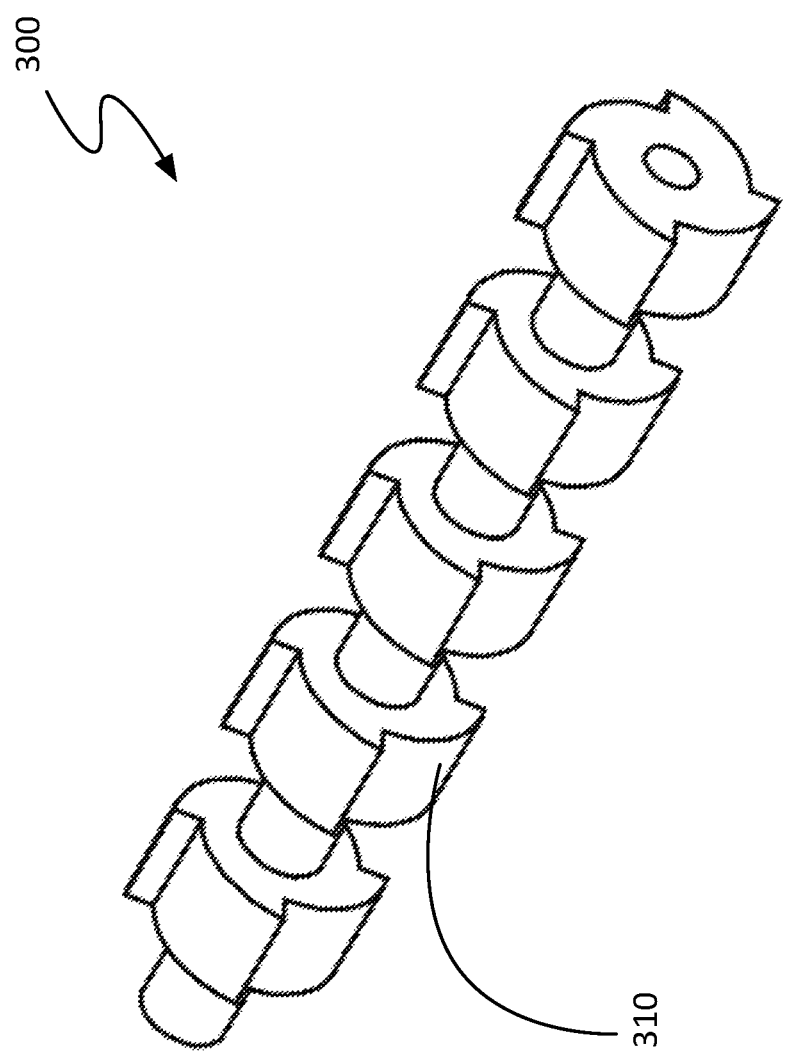
FIG. 3A is a perspective view of a roller.
Figure 3B:
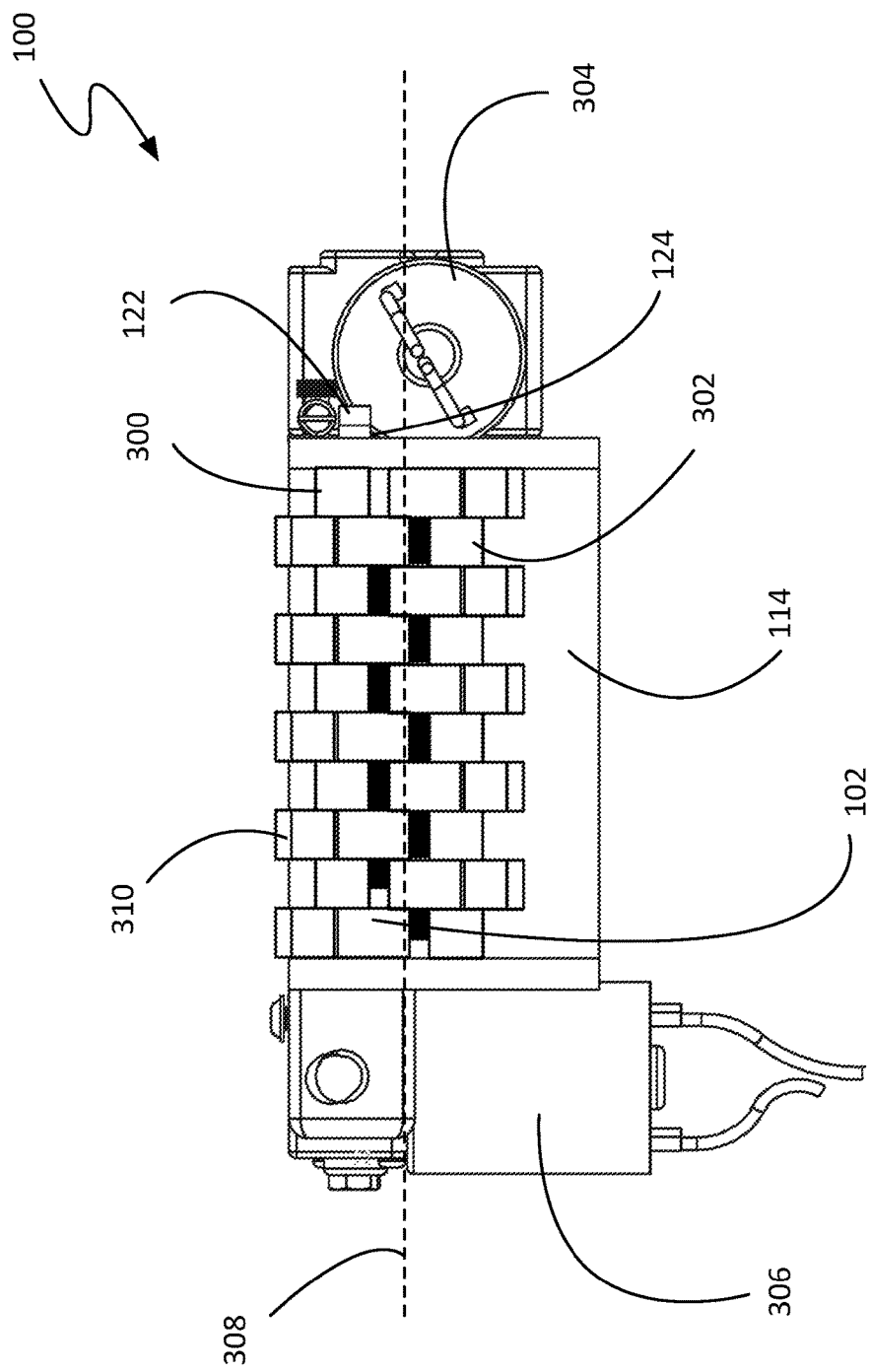
FIG. 3B is a front view of a self-destructive storage system having rollers.
Figure 3C:
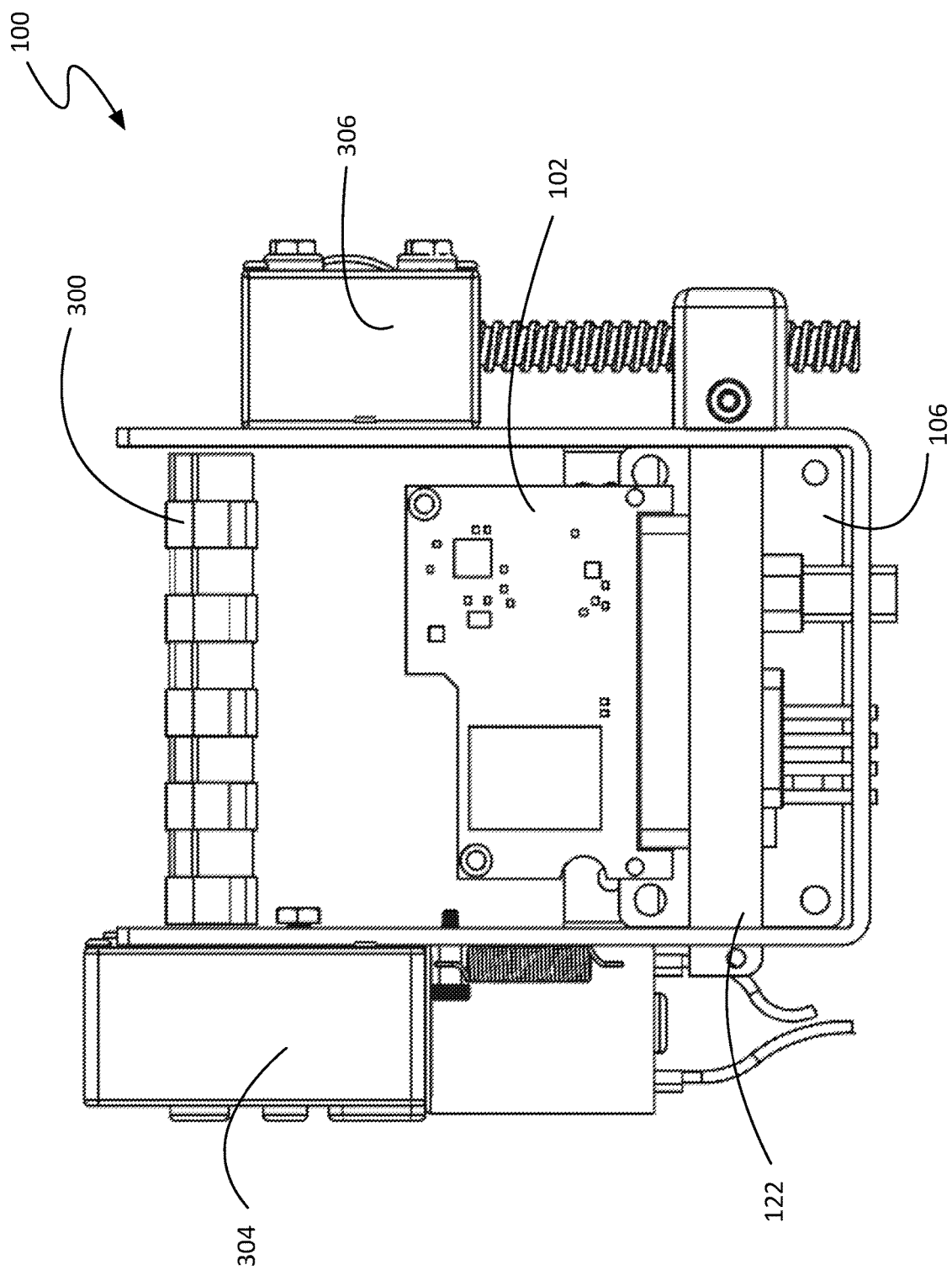
FIGS. 3C and 3D are top views of the self-destructive storage system of FIG. 3A before and after activation, respectively.
Figure 3D:
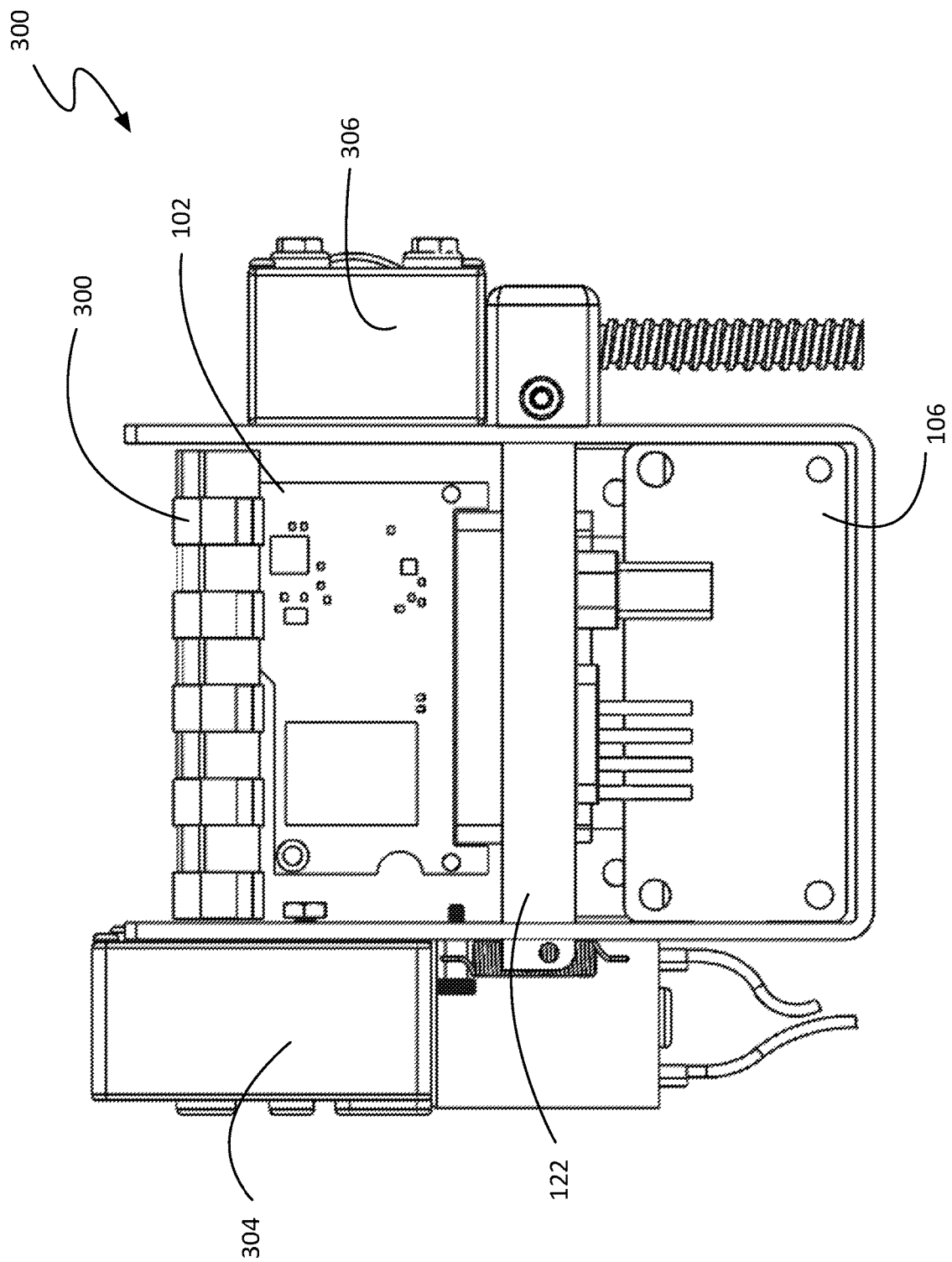

FIGS. 3A-D show a non-limiting example of a mechanical destruction mechanism 104 that uses toothed rollers 300, 302, to crush or shred the digital storage 102. Specifically, FIG. 3A is a perspective view of a non-limiting example of a toothed roller 300. FIG. 3B is a front view of a self-destructive storage system 100 comprising a destruction mechanism 104 that is roller-based. FIGS. 3C and 3D are top views of the self-destructive storage system 100 of FIG. 3B, before and after activation, respectively.

As shown, the roller-based destruction mechanism 104 comprises a first roller 300 and a second roller 302, both having teeth 310 that at least partially interlock (e.g. there is some over lap between the teeth, meaning a sheet could not pass between without being deformed). Those skilled in the art will recognize that shredding may be accomplished using a variety of tooth shapes, spacing, and degree of overlap.

The first roller 300 is positioned above a plane 308 of the digital storage 102 (e.g. a plane roughly parallel to the primary dimensions of the digital storage 102, etc.) and the second roller 302 is positioned below the plane 308, with the teeth 310 at least partially interlocking such that as the rollers turn and the digital storage 102 passes between them, the digital storage 102 will be shredded and rendered unreadable.

The rollers are coupled to a motor 304. In some embodiments, the motor 304 is coupled to the rollers through a gear system to increase the crushing power. The motor 304 is communicatively coupled to the controller 106 so that it may be activated at the appropriate time.

According to some embodiments, before activation the digital storage 102 is in contact with at least one of the rollers, such that upon activation and the rollers begin rotating, the digital storage 102 will be pulled into the destruction mechanism 104 and be shredded.

In some embodiments, including the embodiment shown in FIGS. 3B-D, the digital storage 102 may be mounted to a shuttle 122, allowing it to slide relative to the destruction mechanism 104 that is fixedly mounted to the drive enclosure 114. The shuttle 122 is slideably coupled to one or more linear guides 124 (e.g. slots, rails, grooves, etc.) of the drive enclosure 114. In other embodiments, the destruction mechanism 104 may be mounted to the shuttle 122 while the digital storage 102 remains stationary with respect to the enclosure 114. In either case, activation of the roller-based destruction mechanism 104 results in the mechanism 104 and the digital storage 102 being driven together, such that the digital storage 102 is crushed and shredded by the teeth of the rollers.

In some embodiments, the shuttle 122 is driven by a motor. For example, in one embodiment, the shuttle 122 might be driven by the same motor 304 driving the rollers. In other embodiments, including the non-limiting example shown in FIGS. 3B-3D, the shuttle 122 is driven by a second motor 306, which may be a linear actuator or other mechanism capable of creating linear motion.

In other embodiments, before activation the digital storage 102 may be in contact with at least one of the rollers, such that upon activation and the rollers begin rotating, the digital storage 102 will be pulled into the destruction mechanism 104 and be shredded.

Figure 4:
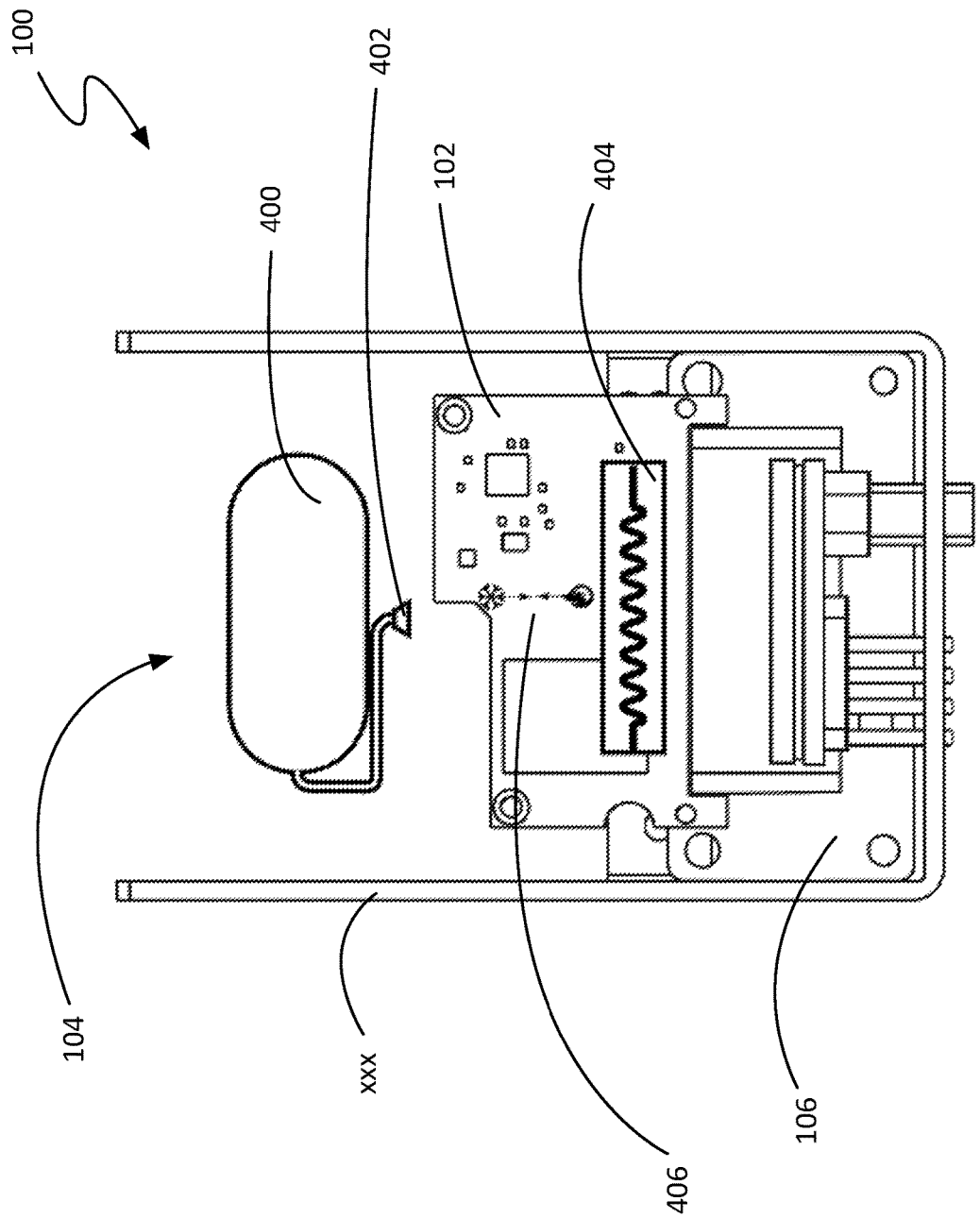
FIG. 4 is a top view of a thermal-based self-destructive storage system.

FIG. 4 is a top view of a non-limiting example of a self-destructive storage system 100 having a thermal shock based destruction mechanism 104. As shown, the destruction mechanism 104 comprises a supply of cryofluid 400 (e.g. non-caustic, inert material stored in liquid form such that rapid expansion causes a drastic temperature drop, etc.) in fluid communication with an electric valve 402 that is communicatively coupled to the controller 106. The mechanism 104 further comprises at least one heating element 404 that is in thermal contact with the digital storage 102.

Rapidly cycling between extremely hot and extremely cold temperatures can cause the digital storage 102 to warp, fracture, or even shatter, and may further disrupt the data itself. In one embodiment, upon activation of the destruction mechanism, the heating elements 404 are powered. Once the digital storage 102 has been heated to a critical temperature, the valve 402 is opened and extremely cold cryofluid is released onto the digital storage 102, causing irreversible damage and rendering the data unreadable. Other temperature manipulation devices, such as thermoelectric coolers and passive heaters, and any other device known in the art, may be employed.

In some embodiments, the temperature of the entire digital storage 102 may be rapidly changed, while in other embodiments different regions of the digital storage 102 may be driven to extreme temperatures causing sharp temperature gradients 406 across the device. Conflicting thermal expansion and contraction may destroy the digital storage 102.

Figure 5A:
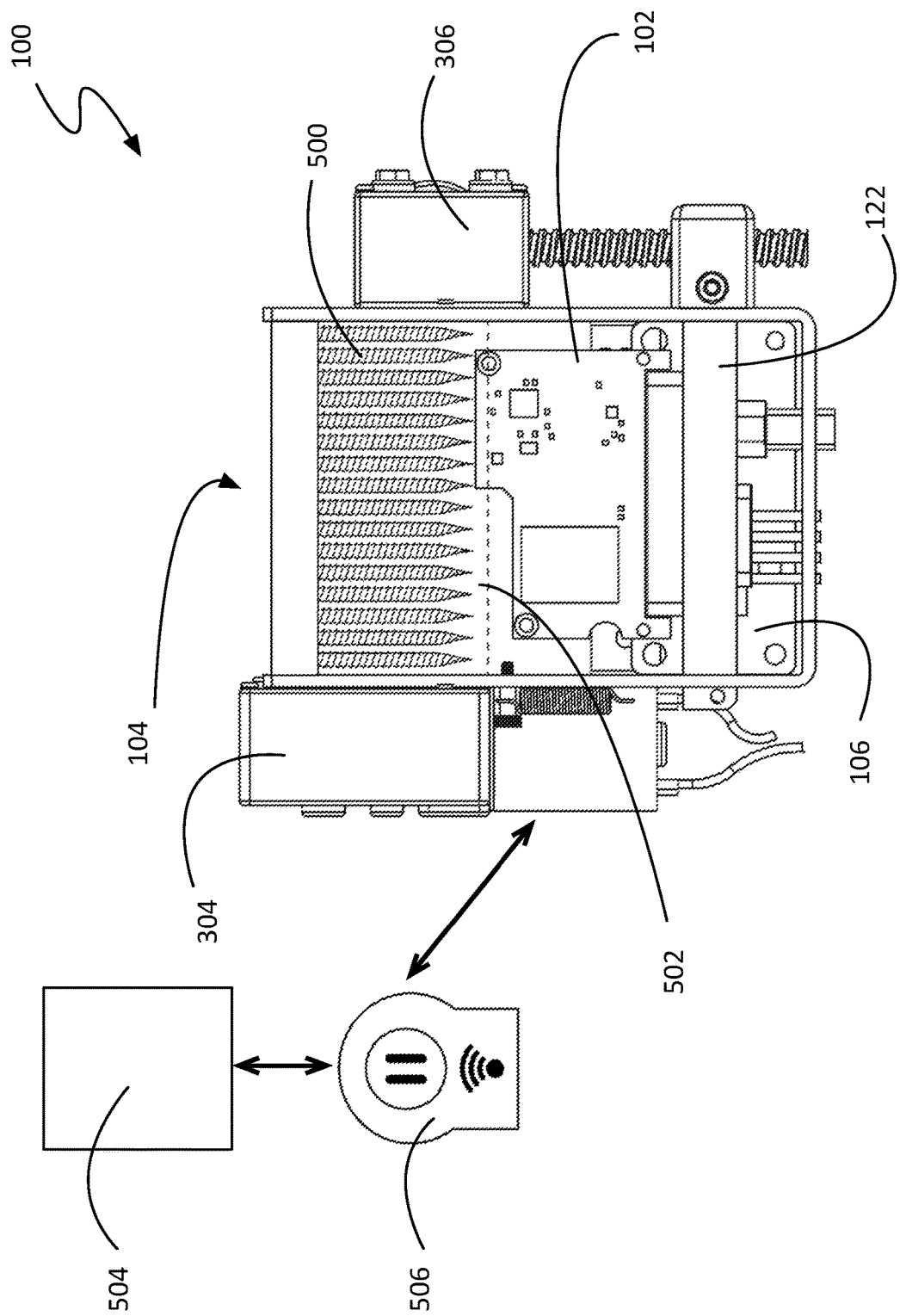
FIGS. 5A and 5B are top views of a self-destructive storage system using screws, before and after activation, respectively.
Figure 5B:
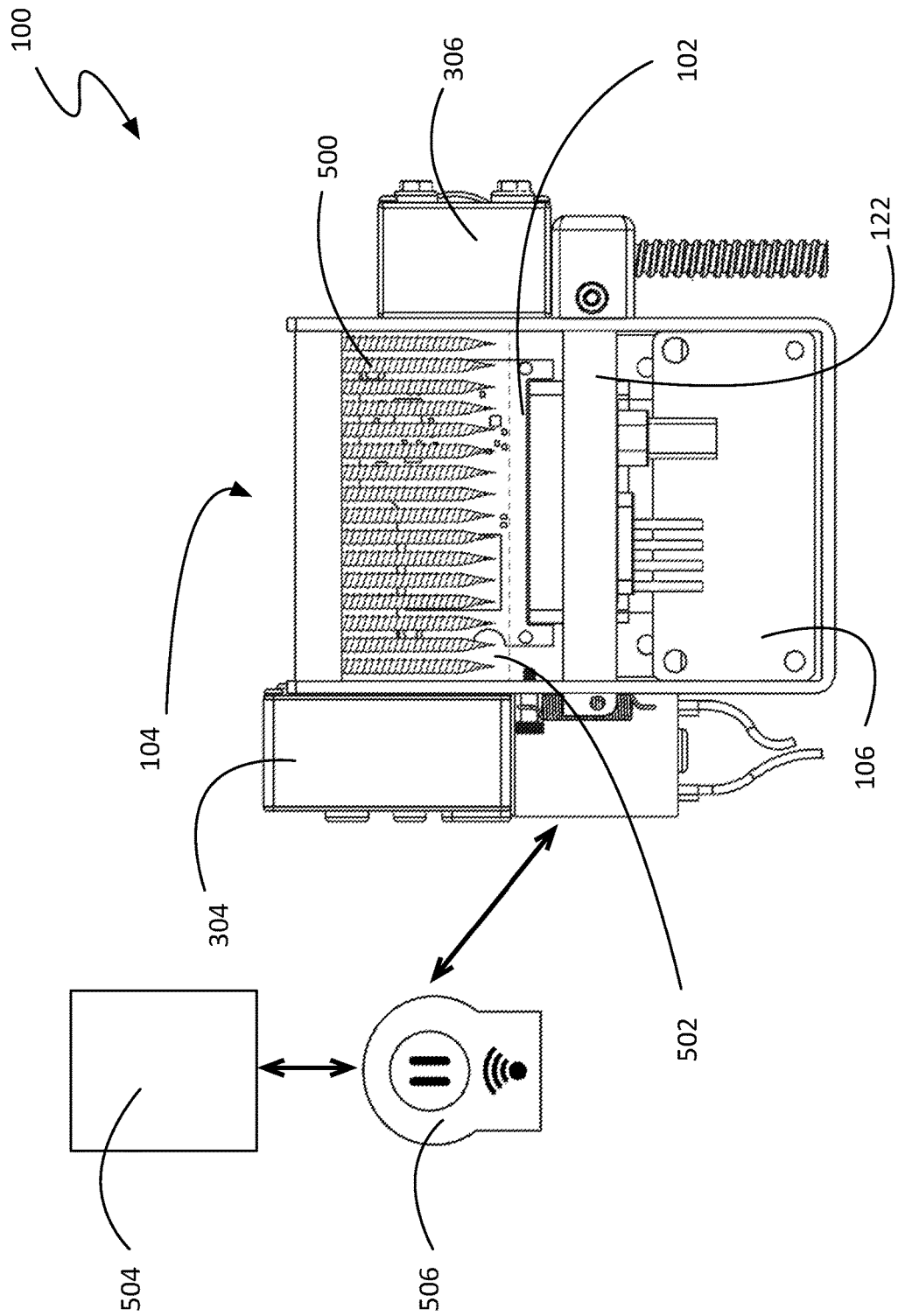

FIGS. 5A-B show a non-limiting example of a mechanical destruction mechanism 104 that uses threaded screws 500, to pulverize or shred the digital storage 102. Specifically, FIGS. 5A and 5B are top views of a self-destructive storage system 100 employing a screw-based destruction mechanism 104, before and after activation, respectively.

As shown, the screw-based destruction mechanism 104 comprises a plurality of threaded screws 500 along an edge of the storage device 102. In some embodiments, the screws 500 may be sandwiched between two guide plates 502 which ensure that, as the screws 500 are driven into the digital storage 102, they stay aligned rather than seeking an easier path outside of the digital storage 102 (or potentially piercing the drive enclosure 114 and possibly damaging the computer 200). The guide plates 502 of FIGS. 5A and 5B have been rendered transparent (dashed line) for clarity. In other embodiments, the screws 500 may be advanced towards the digital storage 102, and the digital storage 102 may be sandwiched between the guide plates 502.

The threaded screws 500 are driven by a motor 304 that is communicatively coupled with the controller 106. Upon activation of the destruction mechanism 104, the screws are driven into the storage device 102 as it advances forward, chewing the device into rubble that is pulled outward by the threads of the screws 500. One advantage of a screw-based destruction mechanism 104 is that the remains of the digital storage 102 remain next to the screws 500, where they continue to be ground up until power is cut.

In some embodiments, the controller 106 may be a device located inside of the drive enclosure 114. In other embodiments, the controller 106 may exist outside of the enclosure 114. For example, as shown in FIGS. 5B and 5C, the role of controller 106 may be filled by a Wi-Fi enabled smart outlet 506 that is connected to a power source. Upon activation of the smart outlet 506 (here, a destroy command 204 takes the form of an "on" signal sent to the smart outlet 506), power is supplied to the destruction mechanism 104 and the digital storage 102 is destroyed. As an option, the smart outlet 506 may be connected to an external battery, such as an uninterruptable power supply (UPS) 504.

Figure 6:
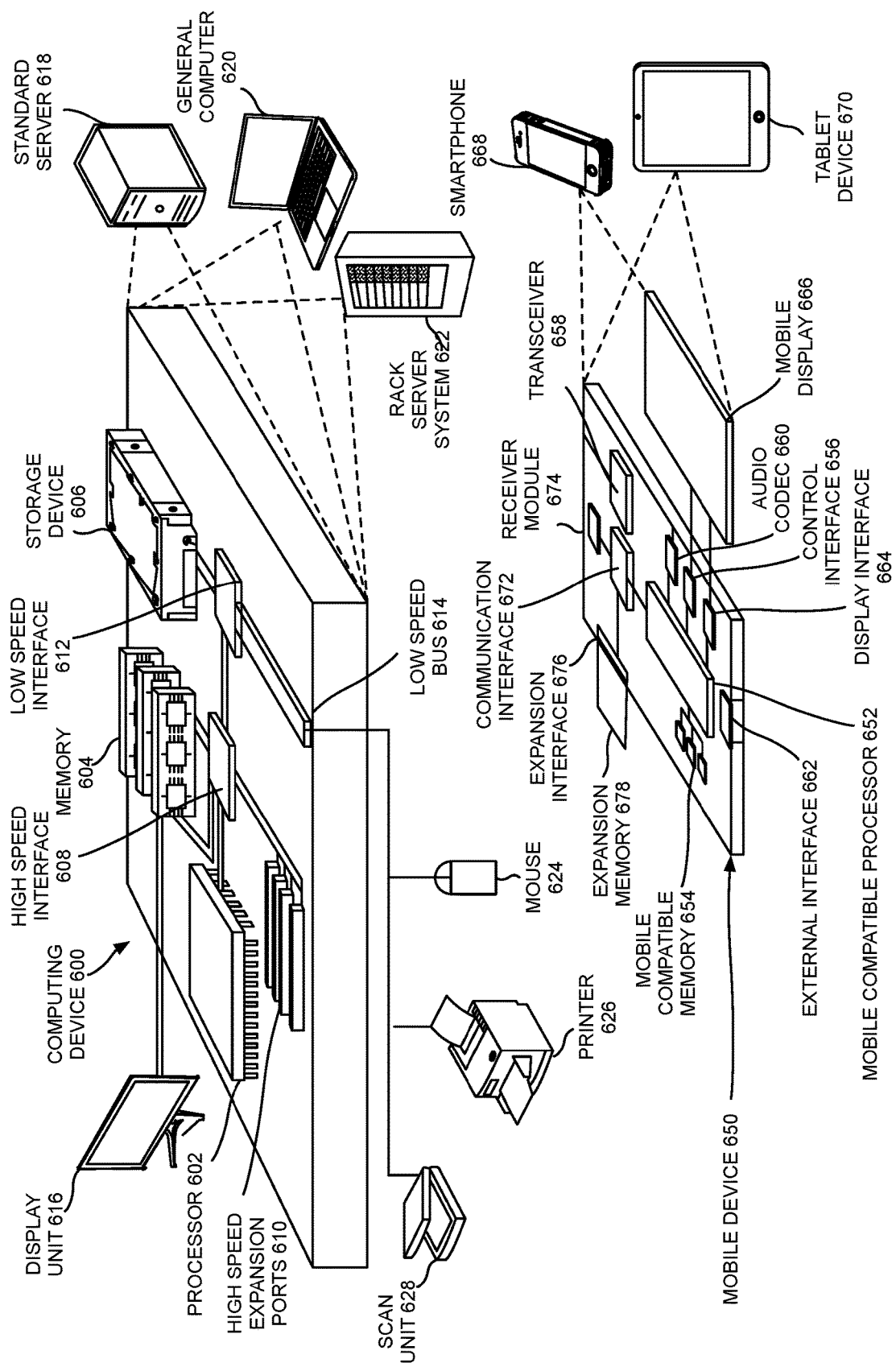
FIG. 6 is a schematic diagram of a specific computing device that can be used to implement the methods and systems disclosed herein.

FIG. 6 is a schematic diagram of specific computing device 600 and a specific mobile computing device 650 that can be used to perform and/or implement any of the embodiments disclosed herein. In one or more embodiments, computer 200 of FIG. 2 may be the specific computing device 600, and smart phone 214 of FIG. 2 may be specific mobile computing device 650.

The specific computing device 600 may represent various forms of digital computers, such as laptops, desktops, workstations, personal digital assistants, servers, blade servers, mainframes, and/or other appropriate computers. The specific mobile computing device 630 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The specific computing device 600 may include a processor 603, a memory 605, a storage device 606, a high speed interface 608 coupled to the memory 605 and a plurality of high speed expansion ports 610, and a low speed interface 612 coupled to a low speed bus 614 and a storage device 606. In one embodiment, each of the components heretofore may be inter-coupled using various buses, and may be mounted on a common motherboard and/or in other manners as appropriate. The processor 603 may process instructions for execution in the specific computing device 600, including instructions stored in the memory 605 and/or on the storage device 606 to display a graphical information for a GUI on an external input/output device, such as a display unit 616 coupled to the high speed interface 608, according to one embodiment.

In other embodiments, multiple processors and/or multiple buses may be used, as appropriate, along with multiple memories and/or types of memory. Also, a plurality of specific computing device 600 may be coupled with, with each device providing portions of the necessary operations (e.g., as a server bank, a group of blade servers, and/or a multi-processor system).

The memory 605 may be coupled to the specific computing device 600. In one embodiment, the memory 605 may be a volatile memory. In another embodiment, the memory 605 may be a non-volatile memory. The memory 605 may also be another form of computer-readable medium, such as a magnetic and/or an optical disk. The storage device 606 may be capable of providing mass storage for the specific computing device 600. In one embodiment, the storage device 606 may be includes a floppy disk device, a hard disk device, an optical disk device, a tape device, a flash memory and/or other similar solid state memory device. In another embodiment, the storage device 606 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 605, the storage device 606, a memory coupled to the processor 603, and/or a propagated signal.

The high speed interface 608 may manage bandwidth-intensive operations for the specific computing device 600, while the low speed interface 612 may manage lower bandwidth-intensive operations. Such allocation of functions is exemplary only. In one embodiment, the high speed interface 608 may be coupled to the memory 605, the display unit 616 (e.g., through a graphics processor and/or an accelerator), and to the plurality of high speed expansion ports 610, which may accept various expansion cards.

In the embodiment, the low speed interface 612 may be coupled to the storage device 606 and the low speed bus 614. The low speed bus 614 may be comprised of a wired and/or wireless communication port (e.g., a Universal Serial Bus ("USB"), a Bluetooth® port, an Ethernet port, and/or a wireless Ethernet port). The low speed bus 614 may also be coupled to the scan unit 628, a printer 626, a keyboard, a mouse 624, and a networking device (e.g., a switch and/or a router) through a network adapter.

The specific computing device 600 may be implemented in a number of different forms, as shown in the figure. In one embodiment, the specific computing device 600 may be implemented as a standard server 618 and/or a group of such servers. In another embodiment, the specific computing device 600 may be implemented as part of a rack server system 622. In yet another embodiment, the specific computing device 600 may be implemented as a general computer 620 such as a laptop or desktop computer. Alternatively, a component from the specific computing device 600 may be combined with another component in a specific mobile computing device 630. In one or more embodiments, an entire system may be made up of a plurality of specific computing device 600 and/or a plurality of specific computing device 600 coupled to a plurality of specific mobile computing device 630.

In one embodiment, the specific mobile computing device 630 may include a mobile compatible processor 632, a mobile compatible memory 634, and an input/output device such as a mobile display 646, a communication interface 652, and a transceiver 638, among other components. The specific mobile computing device 630 may also be provided with a storage device, such as a microdrive or other device, to provide additional storage. In one embodiment, the components indicated heretofore are inter-coupled using various buses, and several of the components may be mounted on a common motherboard.

The mobile compatible processor 632 may execute instructions in the specific mobile computing device 630, including instructions stored in the mobile compatible memory 634. The mobile compatible processor 632 may be implemented as a chipset of chips that include separate and multiple analog and digital processors. The mobile compatible processor 632 may provide, for example, for coordination of the other components of the specific mobile computing device 630, such as control of user interfaces, applications run by the specific mobile computing device 630, and wireless communication by the specific mobile computing device 630.

The mobile compatible processor 632 may communicate with a user through the control interface 636 and the display interface 644 coupled to a mobile display 646. In one embodiment, the mobile display 646 may be a Thin-Film-Transistor Liquid Crystal Display ("TFT LCD"), an Organic Light Emitting Diode ("OLED") display, and another appropriate display technology. The display interface 644 may comprise appropriate circuitry for driving the mobile display 646 to present graphical and other information to a user. The control interface 636 may receive commands from a user and convert them for submission to the mobile compatible processor 632.

In addition, an external interface 642 may be provide in communication with the mobile compatible processor 632, so as to enable near area communication of the specific mobile computing device 630 with other devices. External interface 642 may provide, for example, for wired communication in some embodiments, or for wireless communication in other embodiments, and multiple interfaces may also be used.

The mobile compatible memory 634 may be coupled to the specific mobile computing device 630. The mobile compatible memory 634 may be implemented as a volatile memory and a non-volatile memory. The expansion memory 658 may also be coupled to the specific mobile computing device 630 through the expansion interface 656, which may comprise, for example, a Single In Line Memory Module ("SIMM") card interface. The expansion memory 658 may provide extra storage space for the specific mobile computing device 630, or may also store an application or other information for the specific mobile computing device 630.

Specifically, the expansion memory 658 may comprise instructions to carry out the processes described above. The expansion memory 658 may also comprise secure information. For example, the expansion memory 658 may be provided as a security module for the specific mobile computing device 630, and may be programmed with instructions that permit secure use of the specific mobile computing device 630. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 634, the expansion memory 658, a memory coupled to the mobile compatible processor 632, and a propagated signal that may be received, for example, over the transceiver 638 and/or the external interface 642.

The specific mobile computing device 630 may communicate wirelessly through the communication interface 652, which may be comprised of a digital signal processing circuitry. The communication interface 652 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 638 (e.g., radio-frequency transceiver). In addition, short-range communication may occur, such as using a Bluetooth®, Wi-Fi, and/or other such transceiver. In addition, a GPS ("Global Positioning System") receiver module 654 may provide additional navigation-related and location-related wireless data to the specific mobile computing device 630, which may be used as appropriate by a software application running on the specific mobile computing device 630.

The specific mobile computing device 630 may also communicate audibly using an audio codec 640, which may receive spoken information from a user and convert it to usable digital information. The audio codec 640 may likewise generate audible sound for a user, such as through a speaker (e.g., in a handset smartphone of the specific mobile computing device 630). Such a sound may comprise a sound from a voice telephone call, a recorded sound (e.g., a voice message, a music files, etc.) and may also include a sound generated by an application operating on the specific mobile computing device 630.

The specific mobile computing device 630 may be implemented in a number of different forms, as shown in the figure. In one embodiment, the specific mobile computing device 630 may be implemented as a smartphone 648. In another embodiment, the specific mobile computing device 630 may be implemented as a personal digital assistant ("PDA"). In yet another embodiment, the specific mobile computing device, 630 may be implemented as a tablet device 650.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

Where the above examples, embodiments and implementations reference examples, it should be understood by those of ordinary skill in the art that other digital storage and destruction mechanisms and examples could be intermixed or substituted with those provided. In places where the description above refers to particular embodiments of self-destructive storage systems and customization methods, it should be readily apparent that a number of modifications may be made without departing from the spirit thereof and that these embodiments and implementations may be applied to other to self-destructive storage systems as well. Accordingly, the disclosed subject matter is intended to embrace all such alterations, modifications and variations that fall within the spirit and scope of the disclosure and the knowledge of one of ordinary skill in the art.

What is claimed is:

1. A self-destructive storage system, comprising:
   a digital storage;
   a destruction mechanism that is mechanical, proximate the digital storage, and configured to physically render the digital storage unreadable upon activation, the destruction mechanism comprising:
      a first roller;
      a second roller; and
      a first motor coupled to at least one of the first roller and the second roller;
   a controller comprising a processor and a memory, the controller communicatively coupled to the destruction mechanism and configured to activate the destruction mechanism in response to at least one of the receipt of a destroy command and the satisfaction of a predefined condition;
   a wireless network interface communicatively coupled to the controller and a wireless network; and
   a battery coupled to the controller and the destruction mechanism;
   wherein the digital storage, the controller, the battery, and the destruction mechanism are coupled to a drive enclosure;
   wherein the system further comprises a shuttle slideably coupled to a linear guide of the drive enclosure;
   wherein the destruction mechanism is fixedly coupled to the shuttle and slideably coupled to the drive enclosure through the shuttle;
   wherein the first roller is positioned above a plane of the digital storage and the second roller is positioned below the plane of the digital storage and proximate the first roller, each roller having a plurality of teeth, the teeth of the first roller at least partially interlocking with the teeth of the second roller; and
   wherein upon activation of the destruction mechanism, the first motor rotates the first and second rollers in opposite directions and the shuttle is driven along the linear guide, causing the digital storage to pass between the first and second rollers where it is crushed.

2. The system of claim 1:
   wherein the first motor is a stepper motor; and
   wherein, upon activation of the destruction mechanism, the shuttle is driven along the linear guide by a second motor that is a linear actuator.

3. The system of claim 1, further comprising:
   a sensor comprising at least one of an accelerometer, a light sensor, a gas sensor, a microswitch, and a GPS receiver;

wherein the satisfaction of the predefined condition comprises receiving a reading from the sensor indicating attempted tampering with the system.

4. The system of claim 1, wherein the digital storage is configured to communicatively couple with a computer through the controller, and wherein the controller is configured to allow the digital storage to be mounted by the computer only upon verification that the destroy command has not been issued.

5. The system of claim 1, wherein the system is dimensioned to fit within a standard drive bay.

6. The system of claim 5, wherein the system is sized to fit inside a laptop computer.

7. A self-destructive storage system, comprising:
a digital storage;
a destruction mechanism that is mechanical, proximate the digital storage, and configured to physically render the digital storage unreadable upon activation the destruction mechanism comprising:
  a first roller;
  a second roller; and
  a motor coupled to at least one of the first roller and the second roller;
a controller comprising a processor and a memory, the controller communicatively coupled to the destruction mechanism and the motor, the controller configured to activate the destruction mechanism in response to at least one of the receipt of a destroy command and the satisfaction of a predefined condition;
wherein the digital storage device, the controller, and the destruction mechanism are coupled to a drive enclosure
wherein the system further comprises a shuttle slideably coupled to a linear guide of the drive enclosure;
wherein one of the destruction mechanism and the digital storage is fixedly coupled to the shuttle and slideably coupled to the drive enclosure through the shuttle;
wherein the first roller is positioned above a plane of the digital storage and the second roller is positioned below the plane of the digital storage and proximate the first roller, each roller having a plurality of teeth, the teeth of the first roller at least partially interlocking with the teeth of the second roller; and
wherein upon activation of the destruction mechanism, the motor rotates the first and second rollers in opposite directions and the shuttle is driven along the linear guide, causing the digital storage to pass between the first and second rollers where it is crushed.

8. The system of claim 7, wherein the linear guide is a slot in the drive enclosure.

9. The system of claim 7, further comprising:
a sensor comprising at least one of an accelerometer, a light sensor, a gas sensor, a microswitch, and a GPS receiver;
wherein the satisfaction of the predefined condition comprises receiving a reading from the sensor indicating attempted tampering with the system.

10. The system of claim 7, further comprising a battery coupled to the controller and the destruction mechanism.

11. The system of claim 7, wherein the system is dimensioned to fit within a standard drive bay.

12. The system of claim 7, further comprising a wireless network interface communicatively coupled to the controller and a wireless network.

13. A method for remote drive destruction, comprising:
receiving a destroy command through a controller comprising a processor and a memory, the controller communicatively coupled to a wireless network through a wireless network interface; and
activating a destruction mechanism in response to the destroy command, the destruction mechanism communicatively coupled to the controller, located proximate a digital storage, and configured to physically render the digital storage unreadable upon activation, the destruction mechanism being mechanical and comprising a first roller, a second roller, and a motor coupled to at least one of the first roller and the second roller and communicatively coupled to the controller, and a shuttle slideably coupled to a linear guide;
wherein the digital storage, the controller, and the destruction mechanism are coupled to a drive enclosure dimensioned to fit within a standard drive bay;
wherein one of the destruction mechanism and the digital storage is fixedly coupled to the shuttle and slideably coupled to the drive enclosure through the shuttle;
wherein the first roller is positioned above a plane of the digital storage and the second roller is positioned below the plane of the digital storage and proximate the first roller, each roller having a plurality of teeth, the teeth of the first roller that at least partially interlocking with the teeth of the second roller; and
wherein activating the destruction mechanism comprises driving the first and second rollers to rotate in opposite directions, and also driving the shuttle along the linear guide, causing the digital storage to pass between the first and second rollers where it is crushed.

14. The method of claim 13, further comprising:
determining, using the controller, if a predefined condition has been satisfied; and
activating the destruction mechanism in response to the determination that the predefined condition has been satisfied.

15. The method of claim 13, further comprising:
verifying, using the controller, that the destroy command was not issued while the controller was not powered; and
mounting the digital storage on a computer in response to determining that the destroy command was not issued.

* * * * *